UNITED STATES PATENT OFFICE.

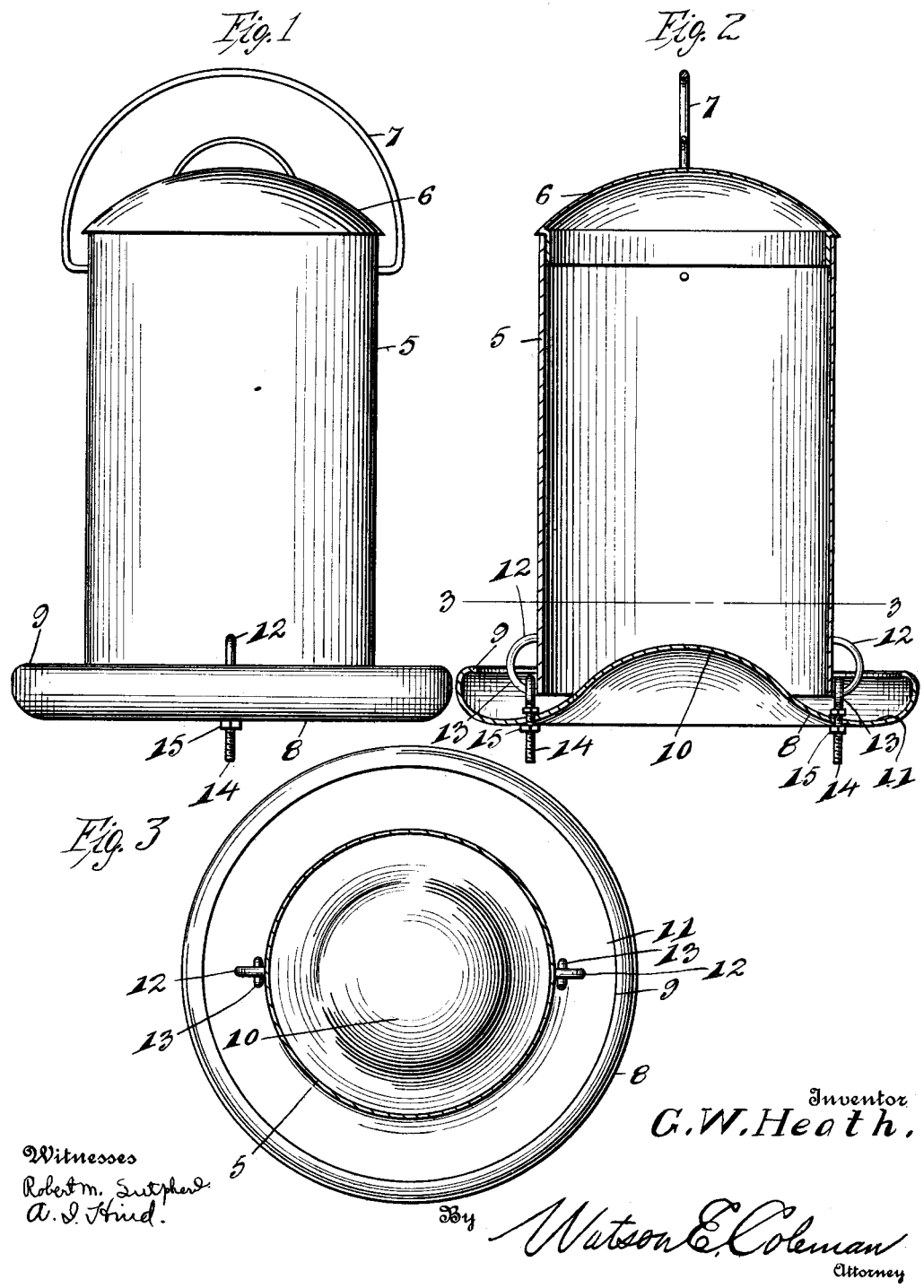

GEORGE WASHINGTON HEATH, OF STONINGTON, CONNECTICUT.

POULTRY-FEEDER.

1,078,853.  Specification of Letters Patent.  Patented Nov. 18, 1913.

Application filed November 23, 1912. Serial No. 733,157.

*To all whom it may concern:*

Be it known that I, GEORGE W. HEATH, a citizen of the United States, residing at Stonington, in the county of New London and State of Connecticut, have invented certain new and useful Improvements in Poultry-Feeders, of which the following is a specification, reference being had to the accompanying drawings.

This invention relates to improvements in poultry feeders and has for its primary object to provide a simple and inexpensive device for this purpose which will effect a material saving in the feed and prevent the same from being wasted.

Another and more specific object of the invention resides in the provision of a hopper or container and a tiltable trough associated therewith adapted to be moved by the fowls whereby the feed is automatically fed from the container into said trough.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a poultry feeder embodying the present invention; Fig. 2 is a vertical section thereof; and Fig. 3 is a section taken on the line 3—3 of Fig. 2.

Referring in detail to the drawing, 5 designates a hopper or container for the feed, which, in the illustrated embodiment of the invention, is of cylindrical form and is provided upon its upper end with a removable cover 6. A bail 7 is also attached to the upper closed end of this container whereby the same may be conveniently suspended from any suitable support.

The lower end of the hopper or container 5 is open and beneath the same the feed receiving and agitating member 8 is arranged. This member is in the form of a sheet metal plate, the edge of which is bent or curved upwardly and inwardly as indicated at 9, to produce a retaining flange thereon, said flange being disposed in spaced relation to the wall of the container 5. The central portion of the member 8 is bent or bulged as shown at 10 to extend upwardly within the lower open end of the container 5. As will be observed from reference to Fig. 2, by forming the member 8 in this manner, an annular trough 11 is produced into which the feed is directed from the container 5 by the downwardly and outwardly sloping or inclined walls formed by the upwardly projecting central portion 10 of said member.

Loops 12 are secured to the wall of the container 5 at diametrically opposite points, and upon these loops the eyes 13 upon the upper ends of the bolts 14 are engaged. These bolts are loosely disposed through openings in the plate 8 and upon the same the nuts 15 are threaded. These nuts are arranged upon opposite sides of the plate 8 and are adapted for clamping engagement therewith to hold the plate 8 normally in spaced relation to the lower open end of the container. It will be apparent that by simply adjusting these nuts upon the bolts 14, the space between the upper surface of said plate and the container wall may be varied as desired so as to permit a greater or less amount of the feed to flow beneath said wall and into the annular trough 11. It will be apparent that by mounting the member 8 in this manner, when the fowls strike the outer edge of said member in feeding from the trough 11, the same will be tilted so that the upwardly projecting central portion 10 thereof will agitate the feed in the container and loosen the same so that it will readily flow outwardly into the trough and thus replenish the same. The inwardly turned flange 9 prevents the feed being scattered upon the ground by the fowls, thus effecting a material saving.

From the foregoing it is believed that the construction and manner of use of my improved poultry feeder will be clearly understood. The device is simple in its construction and may be readily adjusted so as to adapt the device for the feeding of a large or small number of fowls. The combined trough and agitating member 8 may be easily and quickly removed and thoroughly cleansed when necessary, thus maintaining the device in a sanitary condition. Owing to the fact that my invention consists of comparatively few elements which are of simple form, it will be obvious that the same can be produced at small cost. It is also extremely durable and of great convenience in practical use.

While I have shown and described the preferred construction and arrangement of the several parts, it will be obvious that the invention is susceptible of considerable modification without departing from the essential features or sacrificing any of the advantages thereof.

Having thus described the invention, what is claimed is:

A poultry feeder comprising a hopper open at one end, a plate arranged beneath the open end of the hopper and having a central upwardly projecting portion extending into the same, loops secured to the hopper wall at diametrically opposite points and adjacent to its open end, bolts loosely disposed through said plate and provided with eyes upon one of their ends engaged upon said loops, and nuts threaded upon said bolts to secure said plate in an adjusted position with relation to the lower open end of the hopper.

In testimony whereof I hereunto affix my signature in the presence of two witnesses.

GEORGE WASHINGTON HEATH.

Witnesses:
E. W. BROWN,
MASON MANNING.

Copies of this patent may be obtained for five cents each, by addressing the "Commissioner of Patents, Washington, D. C."